US012762797B2

(12) United States Patent
Mehouachi et al.

(10) Patent No.: US 12,762,797 B2
(45) **Date of Patent: *Oct. 13, 2026**

(54) SYSTEMS, METHODS, AND COMPUTER-READABLE MEDIA FOR UTILIZING A SIFRIAN INVERSION TO BUILD A MODEL TO GENERATE AN IMAGE OF A SURVEYED MEDIUM

(71) Applicant: Technology Innovation Institute—Sole Proprietorship LLC, Masdar City (AE)

(72) Inventors: Fares B. Mehouachi, Abu Dhabi (AE); Qingjie Yang, Abu Dhabi (AE); Chaouki Kasmi, Abu Dhabi (AE)

(73) Assignee: Technology Innovation Institute—Sole Proprietorship LLC, Masdar City (AE)

( * ) Notice: Subject to any disclaimer, the term of this patent is extended or adjusted under 35 U.S.C. 154(b) by 112 days.

This patent is subject to a terminal disclaimer.

(21) Appl. No.: 18/781,397

(22) Filed: Jul. 23, 2024

(65) Prior Publication Data

US 2024/0378808 A1 Nov. 14, 2024

Related U.S. Application Data

(63) Continuation of application No. 18/067,927, filed on Dec. 19, 2022, now Pat. No. 12,079,932, which is a continuation of application No. 17/806,299, filed on Jun. 10, 2022, now Pat. No. 11,551,416.

(51) Int. Cl.
*G06T 17/05* (2011.01)

(52) U.S. Cl.
CPC .................................... *G06T 17/05* (2013.01)

(58) Field of Classification Search
CPC ...................... G01V 2210/00–70; G06T 17/05
See application file for complete search history.

(56) References Cited

U.S. PATENT DOCUMENTS

| | | | |
|---|---|---|---|
| 10,054,714 | B2 | 8/2018 | Denli et al. |
| 10,928,534 | B2 | 2/2021 | Warner et al. |
| 11,360,224 | B2 | 6/2022 | Tan et al. |

(Continued)

FOREIGN PATENT DOCUMENTS

| | | |
|---|---|---|
| WO | 2015063444 | 5/2015 |
| WO | 2015199800 | 12/2015 |
| WO | 2019186286 | 10/2019 |

OTHER PUBLICATIONS

Office Action for Algerian Patent Application No. DZ250012, mailed Dec. 17, 2025, 1 page.

(Continued)

*Primary Examiner* — Ryan Mcculley
(74) *Attorney, Agent, or Firm* — DLA Piper LLP (US)

(57) ABSTRACT

Systems, methods, and computer-readable media for using full waveform inversion for imaging surveyed mediums are provided. The full waveform inversion uses a Sifrian functional to fully leverage Hessian information and update a model by augmenting and assembling data derived from the Sifrian functional when equilibrated. The Sifrian inversion produces high resolution images of the surveyed medium typically only seen with full Hessian inversions and can produce such images without requiring supercomputer computation power or extremely long computation time.

20 Claims, 10 Drawing Sheets
(3 of 10 Drawing Sheet(s) Filed in Color)

(56) References Cited

U.S. PATENT DOCUMENTS

| | | | |
|---|---|---|---|
| 2015/0362622 A1 | 12/2015 | Denli et al. | |
| 2016/0238729 A1 | 8/2016 | Warner et al. | |
| 2020/0348430 A1 | 11/2020 | Tan et al. | |
| 2021/0018639 A1 | 1/2021 | Sun et al. | |

OTHER PUBLICATIONS

Notice of Allowance for United Arab Emirates Patent Application No. P6001426/2023, dated Oct. 1, 2024, 9 pages.
Mehouachi, et al., "Exact Stochastic Second Order Deep Learning," arXiv preprint arXiv:2104.03804, 2021, 20 pages.
International Search Report and Written Opinion for Application No. PCT/IB2023/055922, mailed on Sep. 28, 2023, 12 pages.
Mehouachi F.B., et al., "Exact Stochastic Newton Method for Deep Learning: The Feedforward Networks Case," ICLR 2022 Conference Paper3873 Decision—rejection, Retrieved from the Internet URL: http://pamt.at/sifrian, Jan. 28, 2022, 18 pages.
Mehouachi., et al., "Exact Stochastic Newton Method for Deep Learning," arXiv:2104.03804, 2021, 21 pages.
Office Action and Search Report for United Arab Emirates Patent Application No. AEP2024-03248 dated Jun. 17, 2026, 8 pages.

200

SYSTEMS, METHODS, AND COMPUTER-READABLE MEDIA FOR UTILIZING A SIFRIAN INVERSION TO BUILD A MODEL TO GENERATE AN IMAGE OF A SURVEYED MEDIUM

CROSS-REFERENCE TO RELATED APPLICATIONS

This is a continuation of U.S. application Ser. No. 18/067,927, filed Dec. 19, 2022, which is a continuation of U.S. application Ser. No. 17/806,299, filed Jun. 10, 2022, now U.S. Pat. No. 11,551,416, issued Jan. 10, 2023, the content of which are herein incorporated by reference in their entireties.

FIELD OF DISCLOSURE

This disclosure relates to systems, methods, and computer-readable media for generating waveform images, and in particular, to generating waveform images using a Sifrian inversion to update a model that infers the properties of a propagation medium.

BACKGROUND

Many different imaging techniques are known and used in various industries. It is desirable for the images generated using these techniques to be as accurate and definitive as possible. To satisfy these objectives, computationally expensive techniques are used to build models that accurately synthesize properties of a propagation medium. One way to achieve high-resolution results involves the estimation of the inverse of a Hessian, to properly scale gradient-based updates. A Hessian is a square matrix of second-order partial derivates of a scalar field. However, computing and storing the Hessian is computationally expensive and infeasible for real-world applications. The scale of a Hessian is about $N^2$, with N being the number of inverted parameters. N is typically on the order of millions to tens of millions for a relatively small inversion task. In addition, the Hessian is often degenerate, and even with regularization, its inversion has an $N^3$ computational cost. Furthermore, the Hessian typically contains negative eigenvalues, defeating a cost minimization process. As a result, many conventional methods that desire to use the Hessian are required to use truncated or approximated approaches to generate an approximated scaling matrix representative of the Hessian or its inverse. Images generated using this approximated scaling matrix, are easy to compute and implement but can lack sufficient levels of resolution. For example, when an approximate scaling matrix is being used to model a subterranean formation, the numerous approximations might yield a scaling that performs no better than the identity, and the final in-depth resolution may not enable a user of the image to identify items of interest such as oil, gas, and other natural resources or anomalies in general.

Accordingly, there is a need to develop better imaging techniques and devices to fully leverage the Hessian information for investigating the structure of a surveyed propagation medium.

SUMMARY

In some embodiments, a method for waveform imaging is disclosed herein. A computing system receives observed data from a surveyed medium via a plurality of sensors. The computing system generates a model or an image of the surveyed medium. The generating includes obtaining a model, generating synthetic data using the available model, comparing the synthetic data to the observed data, determining that the observed data and the synthetic data are not within a matching threshold, based on the determining, iteratively updating the model, using a Sifrian inversion, until the synthetic data matches the observed data within the matching threshold. The iteratively updating includes augmenting a wavefield equation, an adjoint wavefield, and a gradient definition of the available model by adding a first augmentation variable, a second augmentation variable, and a third augmentation variable to each of the wavefield equation, the adjoint wavefield, and the gradient definition, wherein a cost function, which quantifies mismatches between the synthetic data and the observed data, is strictly omitted, assembling an augmented wavefield function, the augmented adjoint wavefield, and the augmented gradient definition using the first augmentation variable, the second augmentation variable, and the third augmentation variable to create a Sifrian functional, and performing variational perturbation of the update and characterizing the update. The model is updated based on output from the Sifrian functional. The computing system generates a final model or a final image of the surveyed medium.

In some embodiments, a device for waveform imaging and model building is disclosed herein. The device includes an interface and a data processing unit. The interface is configured to accommodate an initial model and observed data for a surveyed medium. The data processing unit connected to the interface. The data processing unit is configured to generate synthetic data. The data processing unit is further configured to compare the synthetic data to the observed data. The data processing unit is further configured to determine that the observed data and the synthetic data are not within a matching threshold. The data processing unit is further configured to, based on the determining, iteratively update the initial model, using a Sifrian inversion, until the synthetic data matches the observed data within the matching threshold. The iteratively updating includes augmenting a wavefield equation, an adjoint wavefield, and a gradient definition of the initial model by adding a first augmentation variable, a second augmentation variable, and a third augmentation variable to each of the wavefield equation, the adjoint wavefield, and the gradient definition, wherein a cost function, which quantifies mismatches between the synthetic data and the observed data, is omitted, assembling an augmented wavefield function, an augmented adjoint wavefield, and an augmented gradient definition using the first augmentation variable, the second augmentation variable, and the third augmentation variable to create a Sifrian functional, and performing variational characterization, damping and resolution of the second order update. The data processing unit is further configured to output the model based on iteratively updating the initial model until the synthetic data matches the observed data within the matching threshold. The data processing unit is further configured to generate the image or the model of the surveyed medium.

In some embodiments, a method for waveform imaging and model building is disclosed herein. The method includes collecting observed data for a surveyed medium from a plurality of sensors. The method further includes obtaining an initial model and synthetic data derived from the initial model. The method further includes iteratively updating the model until the synthetic data matches the observed data within a matching threshold. The model includes a wavefield equation, an adjoint wavefield, and a gradient definition.

Iteratively updating the model includes using a Sifrian inversion. The Sifrian augments the wavefield equation, the adjoint wavefield, and the gradient definition by adding respective first, second, and third augmentation variables to each of the wavefield equation, the adjoint wavefield, and the gradient definition, wherein a cost function, which quantifies mismatches between the synthetic data and the observed data, is omitted. The Sifrian assembles the augmented wavefield function, the augmented adjoint wavefield, and the augmented gradient definition; and performs variational characterization of a second order update. The method further includes generating an image of the surveyed medium, using the updated model, wherein the image of the surveyed medium is usable to locate an object suitable for further exploration.

This Summary is provided to encapsulate some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

The above and other aspects of the disclosure, its nature, and various features will become more apparent upon consideration of the following detailed description, taken in conjunction with the accompanying drawings, in which like reference characters may refer to like parts throughout.

DETAILED DESCRIPTION

Figure 1:
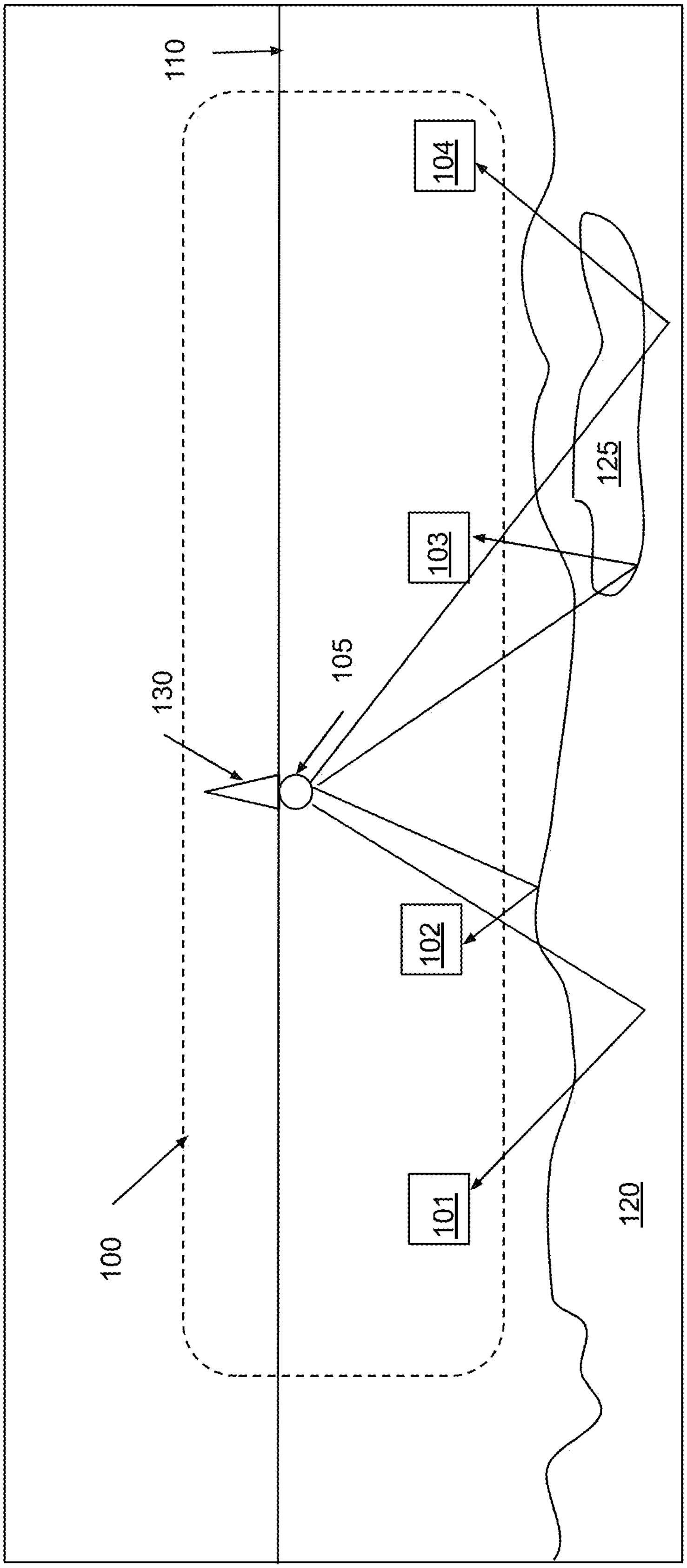
FIG. 1 illustrates an example receiver network, according to example embodiments.

Systems, methods, and computer-readable media for using waveform imaging methods in the frequency domain that permit full and efficient use of second-order derivatives to infer propagation medium properties of a surveyed medium are disclosed herein. A Lagrangian-like function, referred to herein as a Sifrian, may be used to fully leverage a full second-order Hessian tensor to perform inversion and infer wavefield properties of a surveyed medium. In some embodiments, a Sifrian inversion and inherent simplifications may be used to update a model that can be used to generate high-resolution images of a surveyed medium. The Sifrian inversion may be used to solve the image resolution problem observed when conventional methods are used to process data acquired for a surveyed propagation medium.

In some embodiments, a method for waveform imaging exploration is provided. The method can include collecting observed data for a surveyed medium from a plurality of sensors, obtaining an initial model and synthetic data derived from the initial model, and iteratively updating the model until the synthetic data matches the observed data within a small, prefixed threshold. The model and the inverse problem can include a wavefield equation, a cost function, and a gradient definition. The model can be iteratively updated based on a Sifrian function that augments the wavefield equation, an adjoint wavefield, and the gradient definition by adding respective first, second, and third augmentation variables to each of the wavefield equation, the adjoint wavefield, and the gradient definition, wherein the cost function, which quantifies mismatches between the synthetic data and the observed data is strictly not included in the Sifrian function. The Sifrian assembles the augmented wavefield equation, augmented adjoint wavefield, and the augmented gradient definition, and equals zero when equilibrated. The nullity extends to derivatives. The method can include generating an image of the surveyed medium, using the updated model, wherein the image of the surveyed medium is usable to locate an object suitable for further exploration.

In some embodiments, a method for waveform imaging is disclosed herein. A computing system receives observed data from a surveyed medium via a plurality of sensors. The computing system generates an image or a model of the surveyed medium. The generating process requires an initial model which serves as a primary guess of the medium properties. The generating further includes creating synthetic data and comparing it to the observed data and deciding if the mismatches are within a matching threshold. A Lagrangian-like function, referred to herein as Sifrian, is used to fully leverage a full second-order Hessian tensor to perform inversion and infer wavefield properties of a surveyed medium. The embodiments discussed herein use a Sifrian inversion and inherent simplifications to update a model that can be used to generate high-resolution images of a surveyed medium. The Sifrian inversion solves the image resolution problem observed when conventional methods are used to process data acquired for a surveyed propagation medium. The generating process further includes the iterative improvement of the model, using an update provided by the Sifrian inversion, until the synthetic data matches the observed data within the preselected matching threshold.

The Sifrian Inversion process is based on augmenting the wavefield equation, the adjoint wavefield, and the gradient definition. The augmentation is carried through adding a first augmentation variable, a second augmentation variable, and a third augmentation variable to each of the wavefield equation, the adjoint wavefield, and the gradient definition and collecting the products into the same structure. The cost function, which quantifies mismatches between the synthetic data and the observed data, is strictly omitted from the augmentation process. The variations of the composite augmented structure, which is named the Sifrian functional, characterizes the sought-after update. The generating further includes solving the Sifrian characterization, computing a suitable update step and synchronizing the model throughout the system starting from the initial model until the synthetic data matches with the observed data within the predefined matching threshold. The computing system final output is an image or a model of the surveyed medium or any intermediate by-product of the iterative process and the Sifrian inversion.

In some embodiments, a device for waveform imaging is disclosed herein. The device includes an interface and a data processing unit. The interface is configured to accommodate the input of an initial model and store observed data from a surveyed medium. The data processing unit is connected to the interface and carries the model update procedure and any underlying synchronization. The data processing unit is configured to generate synthetic data by passing an estimation of the used energy source through the initial model. The data processing unit is further configured to compare the computed synthetic data to the collected and stored observed data. The data processing unit is further configured to determine that the observed data and the synthetic data are not within a matching threshold, in order to continue the update sequence. The data processing unit is further configured, based on the mismatches quantification, to iteratively update the initial model and subsequent updated versions, using the Sifrian functional characterization, until the synthetic data matches the observed data. The iterative updating is generated through the data processing unit by augmenting a wavefield equation, an adjoint wavefield, and a gradient definition of the initial model by adding a first augmentation variable, a second augmentation variable, and a third augmentation variable to each of the wavefield equation to build the Sifrian functional and. A cost function, which quantifies mismatches between the synthetic data and the observed data, is strictly omitted from the Sifrian functional building. The iteratively updating further includes variational perturbation of the Sifrian to generate a system which characterizes the sought-after update. The data processing unit is further configured to include a solver for the Sifrian characterization and outputting and improved model which reduces mismatches between the synthetic data and the observed. The data processing unit is further configured to run iteratively until the matching condition between observed and synthetic data is fulfilled.

A Hessian or Hessian matrix is a square matrix of second-order partial derivates of a scaler-valued function, or scalar field. The Hessian describes the local curvature of a function of many variables.

A Hessian tensor is a rank-2 covariant symmetric tensor, or a second derivative.

A receiver geometry may refer to the positioning of one or more waveform sensors with respect to a surveyed medium and with respect to one or more waveform sources. The receiver geometry can be two-dimensional or three-dimensional. The waveform sensors are designed to capture data related to a waveform signal emanating from a waveform source. Waveform sources are operative to transmit a waveform or can correspond to natural phenomena acting like a source.

A waveform can be mechanical waves such as seismic, sound, acoustic, and elastic, or electrical waves such as electromagnetic waves.

FIG. 1 illustrates an example receiver network 100, according to example embodiments. As shown, receiver network 100 may be deployed below water surface 110 to collect data on a surveyed medium 120 (e.g., a seafloor) including an object of interest 125 (e.g., natural resources such as oil or gas). Receiver network 100 can include waveform sensors 101-104 and waveform source 105. The positioning of waveform sensors 101-104 and optionally the position of waveform source 105 can define the receiver geometry. A vessel 130 (e.g., a ship or a buoy) may position receiver network 100 in a desired location or move network 100 across the water. Waveform source 105 can emit waveforms that penetrate and travel through surveyed medium 120 before being detected by waveform sensors 101-104, which generate observed data.

Figure 2:
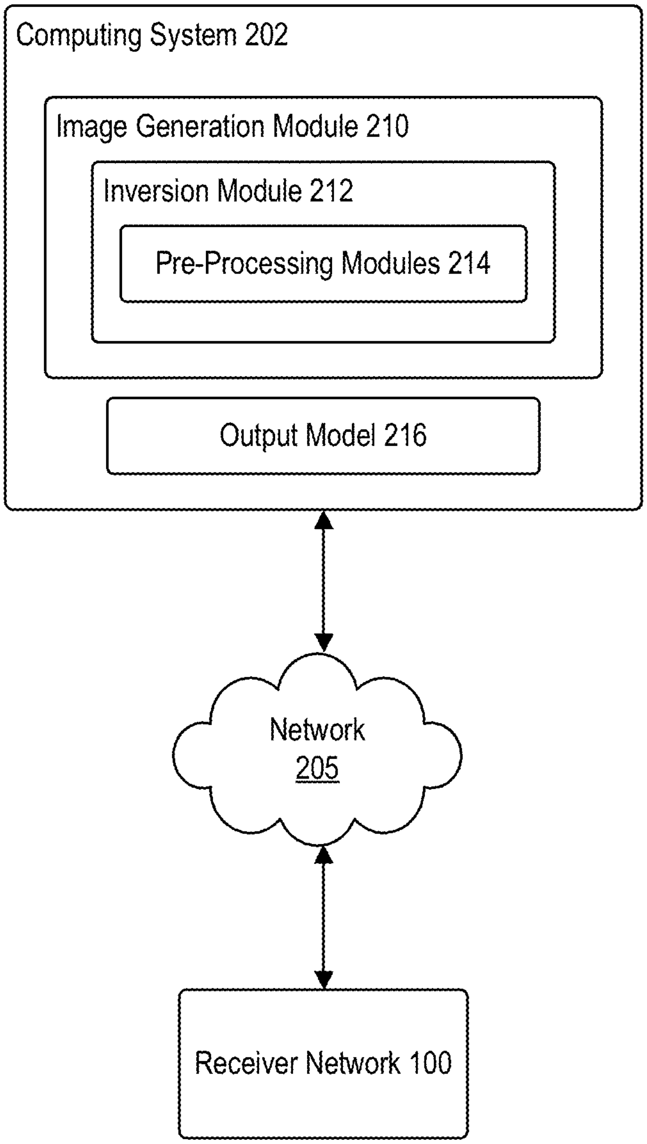
FIG. 2 is a block diagram illustrating a computing environment, according to example embodiments.

FIG. 2 is a block diagram illustrating a computing environment 200, according to example embodiments. Computing environment 200 may include a computing system 202 in communication with receiver network 100. In some embodiments, computing system 202 may communicate with receiver network 100 via network 205.

Network 205 may include any type of computer networking arrangement used to exchange data. For example, network 205 may be the Internet, a private data network, virtual private network using a public network and/or other suitable connection(s) that enables components in computing environment 200 to send and receive information between the components of computing environment 200.

Computing system 202 may be configured to process the sensor data generated from receiver network 100. Computing system 202 may include image generation module 210. Image generation module 210 may be comprised of one or more software modules. The one or more software modules are collections of code or instructions stored on a media (e.g., memory of computing system 202) that represent a series of machine instructions (e.g., program code) that implements one or more algorithmic steps. Such machine instructions may be the actual computer code the processor of back-end computing system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

Image generation module 210 may be configured to generate an image of a surveyed medium. For example, image generation module 210 may utilize sensor data generated using receiver network 100 to generate an image of the surveyed medium. To generate the image of a surveyed medium, image generation module 210 may build a model that is optimized to generate an image of a surveyed medium.

To build the model, image generation module 210 may start with an initial model $m_0$ for analyzing the observed data and iteratively build upon or improve the initial model until the initial model achieves a threshold level of accuracy. The output model (e.g., output model 216) may be an optimized model that can produce a high-resolution image of the surveyed medium.

Image generation module 210 may select or generate initial model $m_0$ to begin the optimization process. In some embodiments, the initial model may be based on an initial guess of the properties of the surveyed medium. In some embodiments, the initial model may be made available through tomography, prior inversion work, and/or expert information on materials. If no information is available, image generation module 210 may test a plurality of initial models. In some embodiments, the initial model can be expressed in terms of spatial coordinates (e.g., either 2D or 3D). The data of the initial model can be represented as a time series as a scalar or multi-component (i.e., vectors), and may be organized with reference to the wavefield source and wavefield sensors' locations, or the receiver geometry.

Image generation module 210 may perform a forward modeling process. For example, image generation module 210 may input the observed data, $d_{obs}$, may be provided as input to initial model $m_0$. Initial model $m_0$ may generate modeled data, d, based on observed data $d_{obs}$. The modeled data, d, may be generated within the same receiver geometry framework used to obtain the observed data $d_{obs}$. In some embodiments, modeled data, d, can be represented as the result of a forward modeling matrix operator F. Operator F may depend on the model m and the angular frequency ω. Operator F may be referred to as a forward propagation operator—F(ω, m). Operator F may be represented as a matrix. In some embodiments, the forward modeling may be conducted in the time domain and later changed to the frequency domain using a Fourier transform.

Generally, the modeled data d generated by the initial model $m_0$ may be different from the observed data $d_{obs}$. This is because the initial model is not the true model, or the "ground truth". The operator F(m) can take different forms depending on various factors, such as, but not limited to, the discretization method for finite differences, finite elements or any other discretization method. The operator F(m) can also depend on the considered physical problem (acoustics, electromagnetics, seismic, etc.).

Image generation module 210 may compare the modeled data, d, to the observed data, $d_{obs}$. These errors may be used by image generation module 210 in a backward modeling process. During the backward modeling process, image generation module 210 may produce an adjoint of the forward wavefield, i.e., known as the backward wavefield.

In some embodiments, image generation module 210 may further cross-correlate forward wavefields and the backward wavefields to generate a gradient. Forward modeling step 525 and backward modeling step 540 produce forward and backward operators, F and F*, and forward and backward sampling operators R and R*. The receiver geometry can be represented by RR*.

After data collection from the sensors, the Sifrian system assembles the wavefield u with its adjoint λ and a derivation kernel $\partial_m F$. This operation requires a device that performs both forward and backward propagation in addition to a concatenation.

As shown, image generation module 210 may include inversion module 212. Inversion module 212 may be configured to generate a Sifrian inversion for updating the initial model, $m_0$, and/or subsequently updated models m. The Sifrian inversion process solves the image resolution problem observed when conventional scaling matrices are used to process data acquired for a surveyed propagation medium.

Inversion module 212 may include pre-processing module 214. Pre-processing module 214 may be configured to pre-process the observed data in a manner that is compatible with the Sifrian inversion. For example, pre-processing module 214 may include a gradient assembling process, a wavefield augmentation process, and an operator assembling process.

Pre-processing module 214 may make use of an adjoint method. For example, pre-processing module 214 may augment the gradient definition and wavefield equations. In some embodiments, the augmentation can be performed by adding a variable to each of the respective gradient definition, wavefield equation, and adjoint wavefield. For example, pre-processing module 214 can augment the gradient definition within an auxiliary variable n, and later assembled by duplicating the data structure that contains the gradient, g, and its conjugate, g*. The augmented gradient definition may expressed as:

$$G_{augmented} = \langle g - \sum_w \left(\frac{\partial F}{\partial m}\right)^* \lambda u*, n \rangle$$

where g is the gradient, ω is the frequency, $\partial_m F^*$ is the first order derivative of the backward operator with respect to the model, λ is an adjoint, u* is the conjugate wavefield, and n is an augmentation variable. The wavefield equation can be augmented by including the forward operator in a data structure and adding additional variable, γ. The augmented wavefield can be expressed as:

$$\text{Wavefield}_{augmented} = \sum_w \langle F(m)u - s, \gamma \rangle$$

Where F is the forward operator, m is the model, u is the wavefield, s is the source, and γ is an augmentation variable. The adjoint wavefield may be augmented with the backward operator, the forward and backward sampling operators, and additional variable ζ. The augmented wavefield can be represented as:

$$\text{Adjoint Wavefield}_{augmented} = \sum_w \langle \frac{\partial J}{\partial u} + F * \lambda, \zeta \rangle$$

where ω is the frequency, $$\frac{\partial J}{\partial u}$$

is the first order derivative of the cost function with respect to the wavefield, F* is the backward operator, λ is the adjoint, and ζ is an augmentation variable. All these elements are injected into a single data structure.

Once the data is pre-processed, and the elements are injected into the single data structure, image generation module 210 may invert the single data structure using a Sifrian inversion. In some embodiments, the inversion can be on one or several frequencies. For example, an increasing mono-frequency inversion process can be used, as it combines efficiency with an implicit regularization induced by preferential optimization of low frequencies. The forward operator, the source and the cost function can be any choice and typically depend on the type of waves used for imaging and inversion.

In some embodiments, prior to inversion the data, image generation module 210 may perform a full Newton directional operation. The Newton directional operation can represent the use of the augmentation variables (γ, ζ, n) to leverage a description of the Hessian without executing the computation necessary for a full Hessian.

Image generation module 210 may then update the initial model, $m_0$, with the results of the Sifrian inversion. Image generation module 210 may continue this iterative process until an optimized model, m*, is generated.

Figure 3:
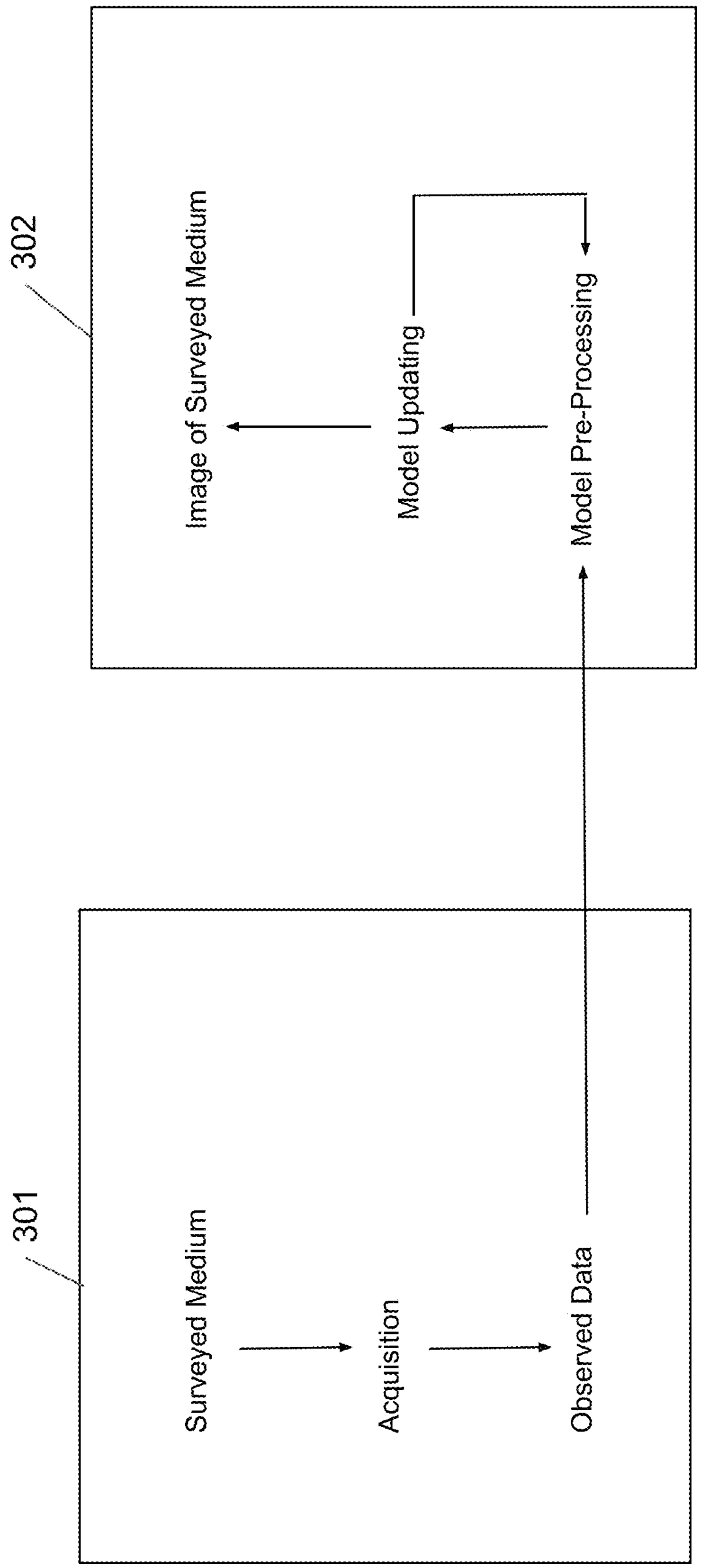
FIG. 3 is schematic illustration of data acquisition of a surveyed medium to generate an image of the medium from the observed data, according to example embodiments.

FIG. 3 is a schematic illustration of data acquisition of a surveyed medium to generate an image of the medium from the observed data. The left side 301 corresponds to observed data extraction relating to the surveyed medium, and the right side 302 corresponds to the observed data processing to generate an image of the surveyed medium.

Figure 4:
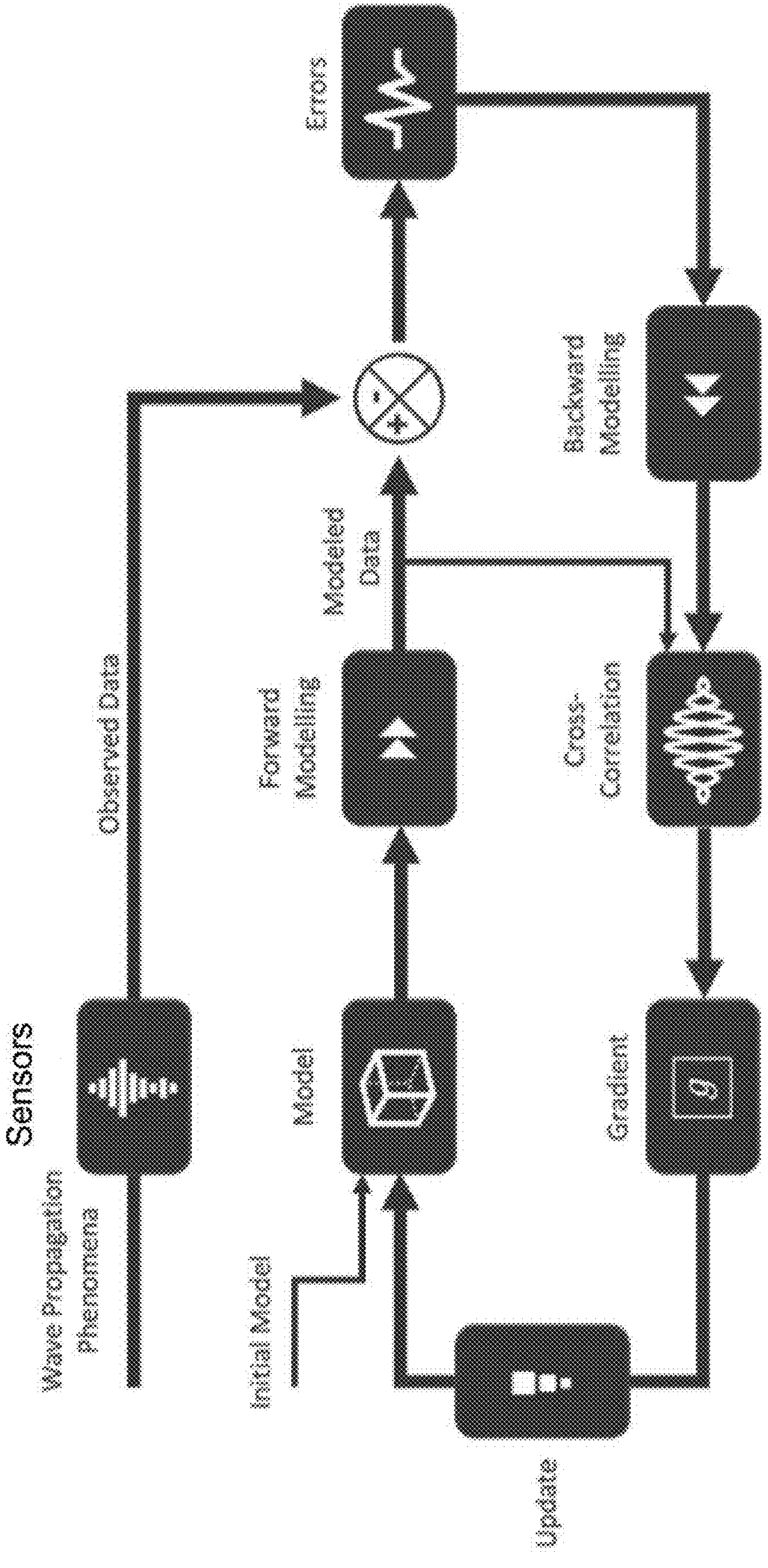
FIG. 4 (Prior Art)
FIG. 4 shows an illustrative schematic diagram of a conventional process for building a model for use in generating an image of a surveyed medium, according to example embodiments.

FIG. 4 shows an illustrative schematic diagram of a conventional process for building a model for use in generating an image of a surveyed medium, according to example embodiments. Conventional image generation schemes use gradient-based inversion methods either in the time or in the frequency domain.

The observed data are used as targets that are matched with the output of a modeling step. The initial model is updated iteratively after calculating the gradient, g, and optionally scaling it with a second-order tensor that approximates the inverse of the curvature matrix. The iterative inversion is stopped when the errors (mismatches) are minor, and the resulting model is considered the final inversion result. Well known methods in this class are Gradient-Descent, Truncated Gauss-Newton, BFGS, and Hessian Free+Conjugate Gradient (HF+CG) methods. The cross-correlation corresponds to a multiplication with the conjugate in the frequency domain. The Forward modeling computes the response of the model excitation with a waveform source at the sensors' locations. The discretization of the wave physics yields different matrix operators depending on the selected method, such as finite elements or finite differences and different modeling parameters. The Backward modeling is the application of the adjoint operator of the forward modeling and allows the backpropagation of the mismatches (errors). An "educated" initial model may be necessary to initiate the iterative building process, and minor updates along step selection procedures are often implemented to avoid divergence issues.

The conventional methods, as illustrated in FIG. 4, cannot fully utilize the benefits of curvature information without any approximations or truncations or ad hoc optimization steps to guess a suitable update. The conventional methods cannot utilize the exact second order information. The conventional methods must rely on approximations or truncations for large scale inversion. This is a limitation that results in poor image quality and resolution.

One or more techniques described herein improve upon such conventional approaches by accessing the total usage of the Hessian information. For example, computing system 202 may preprocess the observed data in a manner that allows for the use of a Sifrian inversion. The Sifrian inversion is the whole curvature inversion process (the Hessian) without any truncations or approximations. Though the embodiments discussed herein may have a computation cost up to two folds higher than the conventional methods, due to damping required to guarantee full-rank inversion, this extra computation cost is compensated with superior results in terms of superior resolution, particularly for distant/deep surveyed mediums. The term 'distant/deep' can vary from a few centimeters for ultrasound imaging to a few meters/kilometers for subsurface terrain imaging.

For a surveyed medium, a wave propagation response is recorded by several sensors after excitation with a source. This recorded data is referred to herein as observed data, $d_{obs}$. The observed data is provided to a Sifrian image generation module that executes several preprocessing steps to condition data for use in a Sifrian inversion. The preprocessing steps can include a data collection stage, a data augmentation stage, and a data assembly stage. The data collection, data augmentation, and data assembly stages condition the data to be compatible with the Sifrian functional, which implements a full curvature inversion process (the Hessian) without any truncations or approximation. Damping of degenerate curvatures is performed in a subspace derived for the augmented data.

Figure 5:
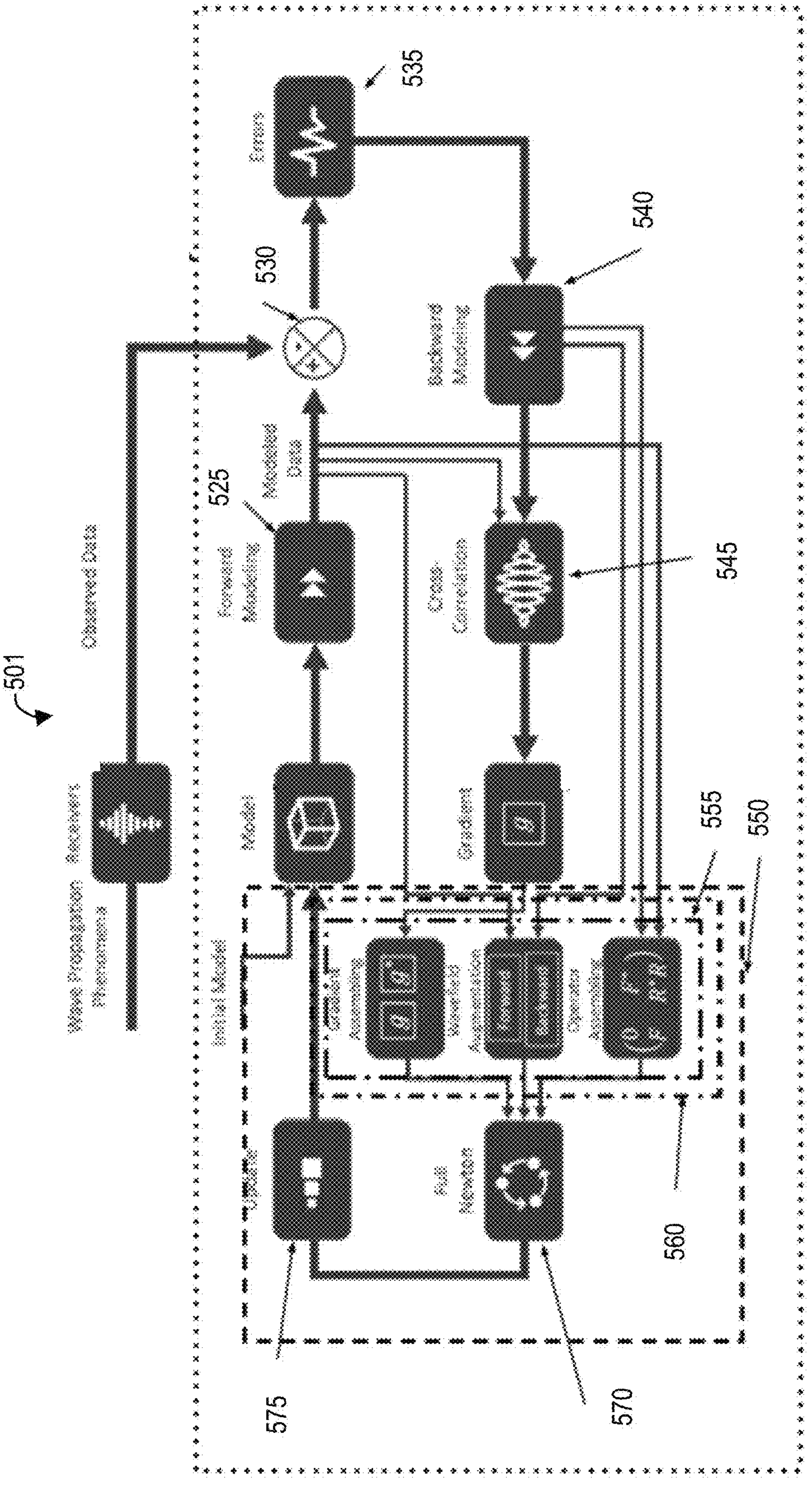
FIG. 5 shows a schematic diagram of a process for building a model for use in generating an image of a surveyed medium, according to example embodiments.

FIG. 5 shows a schematic diagram of a process for building a model for use in generating an image of a surveyed medium, according to example embodiments.

For a given surveyed medium, at step 501, observed data may be collected by sensors that detect wave propagation originating from a source. The observed data may be provided to image generation module 210. As discussed above, and described in more detail below, image generation module 210 may iteratively execute a series of steps to build a model that can produce a high-resolution image of the surveyed medium. In some embodiments, the series of steps may include a forward modeling step 525, a comparison step 530, an error determination step 535, a backward modeling step 540, a cross-correlation step 545, and a Sifrian inversion step 550.

Image generation module 210 may iteratively build an optimized model, m*, based on the observed data, $d_{obs}$. For example, image generation module 210 may select an initial model, $m_0$, to start the iteration process for building model, m*. Initial model, $m_0$, may be based on an initial guess of the properties of the surveyed medium or can be made available through tomography, prior inversion work, or expert information on materials. If no information is available, many constant initial models can be tested. The initial model can be expressed in terms of spatial coordinates (e.g., either 2D or 3D). The data can be represented as a time series as a scalar or multi-component (i.e., vectors), and is organized with reference to the wavefield source and wavefield sensors' locations, or the receiver geometry.

The observed data, $d_{obs}$, can be filtered from random and coherent noise due to the acquisition procedure and both its amplitude and phase are minimally changed. This filtering step is a standard procedure and depends on the type of acquired data. The filtering may occur before the observed data is transmitted to image generation module 210. If synthetic benchmarks are used, the filtering procedure may not be necessary.

Image generation module 210 may use initial model, $m_0$, to generate modeled data, d, in the forward modeling step 525. The modeled data, d, may be generated within the same receiver geometry framework used to obtain the observed data $d_{obs}$. The modeled data, d, can be represented as the result of a forward modeling matrix operator F. Operator F may depend on the model m and the angular frequency ω, and is often referred to as forward propagation operator F(ω, m), and is typically represented as a matrix in practice. The forward modeling can also be conducted in time domain and later changed through Fourier transform to the frequency domain. The data d generated by the initial model $m_0$ is usually different from the observed data $d_{obs}$ because the initial model is not the true model a.k.a. the "ground truth".

The operator F(m) can take different forms depending on the discretization method for finite differences, finite elements or any other discretization method. The operator F(m) can also depend on the considered physical problem (acoustics, electromagnetics, seismic, etc.). For further clarification, Maxwell equations (Eq. 1) and an acoustic wave equation (Eq. 2) are presented below as prime examples of physical phenomena that can be modeled by the Sifrian inversion method according to embodiments discussed herein.

$$i\omega\mu(i\omega\varepsilon+\sigma)E+\nabla\times\nabla\times E=\nabla\times M_s+i\omega\mu J_s$$
$$i\omega\mu(i\omega\varepsilon+\sigma)H+\nabla\times\nabla\times H=\nabla\times J_s+(i\omega\mu+\sigma)M_s$$

Equation (1) shows Maxwell Equations in a dissipative material. E and H are the electric and the magnetic fields, respectively, $M_s$ and $J_s$ play the role of magnetic and electric sources, respectively, (μ, ε, σ) are properties of the propagation medium, i is the complex unit, and ω is the angular frequency.

$$\frac{(i\omega)^2}{K(x)}P(x)-\nabla\cdot\left(\frac{1}{\rho(x)}\nabla P(x)\right)=S(x) \tag{2}$$

Equation (2) shows an Acoustic wave equation with variable density ρ. The pressure wavefield is P, K is the bulk modulus, and S is the source term.

The wave physics in the frequency domain is similar to equations (1) and (2) and for a large spectrum of wave equations and can be summarized as a wavefield response u to an excitation through a source s, linked through a forward operator F. Equation (3) can represent a general model for wave phenomena propagation model in the frequency domain:

$$F(x,\omega,m)u(x,\omega)=s(x,\omega) \tag{3}$$

where x is the spatial coordinate, ω is the angular frequency, and m is the model.

Starting from a model m, forward propagation can create the wavefield u which is used to recover the observed data $d_{obs}$ through a sampling operator R. Equation (4) shows receiver data sampling for the wavefield response:

$$Ru(x,\omega)=d(\omega) \tag{4}$$

The inversion procedure builds a model m whose receivers' data matches the observations $d_{obs}$. A cost function, can be an $l^2$ norm, for example, and is used to quantify the mismatches between d and $d_{obs}$, and it is iteratively minimized using gradient-based method, shown in the cost function of equation (5):

$$J(m)=\frac{1}{2}\sum_\omega\|d(\omega)-d_{obs}(\omega)\|_2^2=\frac{1}{2}\sum_\omega\left\|RF^{-1}(x,\omega,m)s(x,\omega)-d_{obs}(\omega)\right\|_2^2 \tag{5}$$

Starting from an initial model $m_0$, several model updates are built along the following general rule expressed in equation (6):

$$m_{t+1}=m_t-B\left(\frac{dJ}{dm}\right)_{m_t} \tag{6}$$

The gradient, which is the local sensitivity of the cost function to the model perturbation, is the main ingredient in model building and it also requires rescaling, which is performed by the matrix B. The scaling matrix can be the identity for first order methods (i.e., gradient descent) or it can be approximate the inverse of the curvature a.k.a. (the Hessian) for second order methods (Newton type methods). The computation of the gradient is well established through the adjoint-state method, sometimes referred to as backpropagation. Differentiating the forward equation (3) is needed to build a compact formula for the gradient which consists in backpropagating the mismatches and cross-correlating them with the wavefield response u. The gradient expression using a Fréchet derivative is shown in equation (7):

$$\frac{dJ}{dm}=\sum_\omega\mathrm{Re}\left(\left(\frac{du(x,\omega)}{dm}\right)^*R^*R\big(u(x,\omega)-d_{obs}(\omega)\big)\right) \tag{7}$$

The quantity $$\frac{du}{dm}$$

is called the Fréchet derivative and its computation is expensive, yet it can be circumvented by differentiating the forward model (equation 3). Equation (8) shows differentiation of the forward equation:

$$Fu=s\rightarrow\frac{dF}{dm}u+F\frac{du}{dm}=0\rightarrow\frac{du}{dm}=F^{-1}\frac{dF}{dm}u \tag{8}$$

Replacing the Fréchet derivative is critical in simplifying the gradient computation to a cross-correlation between the wavefield u and an adjoint wavefield derived from the mismatches of the cost function. Equation (9) shows the gradient as a cross-correlation product:

$$\frac{dJ}{dm}=\sum_\omega\mathrm{Re}\left(u^T\left(\frac{dF}{dm}\right)^TF^{-T}conj\big(d(x,\omega)-d_{obs}(\omega)\big)\right) \tag{9}$$

In addition to the gradient, the scaling matrix is the second ingredient that plays a significant role in model building. Ideally the scaling matrix should be the inverse of the Hessian in a convex setting. Several methods of approximating the scaling matrix exist in the literature. However, all are based on truncations and approximations; the Hessian, is often degenerate (several null eigenvalues) and suffers concave directions, which corresponds to negative eigenvalues. The non-positive eigenvalues of the Hessian defeat the whole process of cost minimization. Furthermore, computing and storing the curvature (Hessian) is computationally expensive and infeasible beyond toy models. The scale of the Hessian is $N^2$ with N the number of inverted parameters. The N is typically around a million to tens of millions for a moderately small size inversion task.

Conventional methods force the positivity of the scaling matrix B and avoid its direct computing (or storage) through essentially two types of approaches. The first one consists in the BFGS types of updates, which approximates the scaling matrix approximatively with each iteration via a rank-two matrix update. The convergence and properties of BFGS type methods are well studied and established. The second type of conventional method, usually called Hessian-Free, uses adjoint state methods to characterize the product of the Hessian with a preselected update vector, and then adds a search method typically the conjugate gradient to find an update vector that approximately reconstruct the gradient after multiplication with the Hessian. Given that the Hessian is often not positive (has negative eigenvalues), a variation of the Hessian-Free method applicable with the Gauss-Newton approximation is typically used, along with same damping (i.e., adding a small factor $\varepsilon I$) to guarantee a strict positivity of the scaling matrix. The two above-mentioned conventional approaches for determining the scaling matrix avoid forming a curvature matrix and store only results/updates vectors. The general workflow of the conventional methods is illustrated in FIG. 4.

Referring now back to FIG. 5, image generation module 210 may utilize pre-processing steps to characterize the second order direction, sometimes referred to as the Newton direction, to enable use of a Sifrian inversion, which is different from and better performing than the conventional inversion methods. The pre-processing steps make use of the adjoint method. One pre-processing step uses the Lagrangian for the gradient calculation and the extraction of the adjoint system. Equations (10A and 10B) shows the gradient derived from a Lagrangian functional:

$$L = J + \sum_{\omega} \langle F(m)u - s, \lambda \rangle \rightarrow \begin{cases} \frac{\partial}{\partial u} L = \frac{\partial J}{\partial u} + F^{*}\lambda = 0 & \text{(10A)} \\ g = \frac{\partial L}{\partial m} = \sum_{\omega} \mathrm{Re}\left(\frac{\partial F}{\partial m} \lambda u^{*}\right) = \frac{dJ}{dm} & \text{(10B)} \end{cases}$$

The Lagrangian is the sum of the cost function and an inner product between the forward model (Equation 3) and a newly introduced variable $\lambda$. $\lambda$ is called the adjoint wavefield and if it verifies equation 10A (also called the adjoint equation), then the computation of the gradient g significantly simplifies and it is given by equation (10B).

A Lagrangian-like functional is used to build the second order update. This functional is called the Sifrian and is represented by equation (11):

$$S(m, u, \lambda, g, \gamma, \zeta, n) = \sum_{\omega} \langle F(m)u - s, \gamma \rangle + \sum_{\omega} \left\langle \frac{\partial J}{\partial u} + F^{*}\lambda, \zeta \right\rangle + \left\langle g - \sum_{\omega} \left(\frac{\partial F}{\partial m}\right)^{*} \lambda u^{*}, n \right\rangle \quad (11)$$

The Sifrian is a Lagrangian-like functional that is null when in equilibrium (i.e., the propagation equations are verified). The Sifrian uses the forward and backward equations along with the gradient definition. The Sifrian introduces three new adjoints ($\gamma$, $\zeta$, n) to characterize the expression of the Newton direction Hn=g. These adjoints are augmentation variables attached to the wavefield equation, the adjoint wavefield equation, and gradient definition. The Hessian H is neither formed nor expressed explicitly, and only its effect is leveraged to recover the Newton direction, which yields back the gradient g. If the forward equation, backward equations, and gradient definition are verified, the Sifrian is equilibrated, and it is equal to zero.

The Sifrian is null if the forward equation, backward equation, and the gradient definition are verified. Like the Lagrangian, differentiation leads to a block matrix structure, preferably solved for a unique frequency and yielding n as the second order update. The block structure showing the Sifrian system is detailed below in equation (12):

$$\begin{pmatrix} \left(\frac{\partial F}{\partial m} u\right)^{*} & \frac{\partial F}{\partial m} \lambda^{*} & 0 \\ 0 & F & \frac{\partial F}{\partial m} u \\ F^{*} & \frac{\partial^2 J}{\partial m^2} & \frac{\partial F^{*}}{\partial m} \lambda \end{pmatrix} \begin{pmatrix} \gamma \\ \zeta \\ n \end{pmatrix} = \begin{pmatrix} g \\ 0 \\ 0 \end{pmatrix} \quad (12)$$

The modeled data, d, is provided to error determination step 535 so that mismatch errors between modeled data, d, and observed data can be determined. These errors may be provided to backward modeling step 540, which produces an adjoint of the forward wavefield, known as the backward wavefield. The forward wavefields and the backward wavefields may be cross-correlated at step 545 to produce gradient g. Forward modeling step 525 and backward modeling step 540 may produce forward and backward operators, F and F*, and forward and backward sampling operators R and R*. The receiver geometry can be represented by RR*. After data collection from the sensors, the Sifrian system assembles the wavefield u with its adjoint $\lambda$ and a derivation kernel $\partial_m F$. This operation requires a device that performs both forward and backward propagation in addition to a concatenation.

Step 555 can implement data assembling using equation (13):

$$m \rightarrow u \rightarrow \gamma \Rightarrow \begin{pmatrix} \frac{\partial F}{\partial m} u \\ \frac{\partial F^{*}}{\partial m} \lambda \end{pmatrix} \quad (13)$$

The augmented wavefield is completed with an assembling of the wave operators.

Step 555 can implement operator assembly with equation (14):

$$F \rightarrow F^{*} \Rightarrow \Psi = \begin{pmatrix} 0 & F \\ F^{*} & \frac{\partial^2 J}{\partial m^2} \end{pmatrix} \quad (14)$$

The Sifrian system may be reassembled with the assembled data and assembled operators. In some embodiments, the Sifrian system may be damped. The resolution of the Sifrian system yields a new type of update relevant to model building. The efficiency of this approach stems from the augmentation and assembling steps which requires an adequate allocation of computational structures to perform the Sifrian Inversion and simplification therein. The inversion can be on one or several frequencies, but an increasing mono-frequency inversion process is preferred as it combines efficiency with an implicit regularization induced by preferential optimization of low frequencies. The forward operator, the source and the cost function can be any choice and typically depend on the type of waves used for imaging and inversion.

The forward wavefields, backward wavefields, forward operators, backward operators, forward sampling operators, backward sampling operators, and the gradient may be used in Sifrian inversion step 550, such as, in the pre-processing operations (i.e., steps 555 and 560) to condition data for use in the Sifrian inversion. Sifrian inversion step 550 can may include augmentations step 555, assembly step 560, full Newton directional step 570, and update step 575.

In step 555, the gradient definition and wavefield equations may be augmented. The augmentation can be performed by adding a variable to each of the respective gradient definition, wavefield equation, and adjoint wavefield. For example, gradient definition, g, can be augmented within an auxiliary variable n, and later assembled by duplicating the data structure that contains the gradient, g, and its conjugate, g*. The augmented gradient definition is expressed in equation (15), below:

$$G_{augmented} = \langle g - \sum_{w} \left(\frac{\partial F}{\partial m}\right)^{*} \lambda u^{*}, n \rangle \quad (15)$$

where g is the gradient, ω is the frequency, $\partial_m F^*$ is the first order derivative of the backward operator with respect to the model, λ is an adjoint, u* is the conjugate wavefield, and n is an augmentation variable. The wavefield equation can be augmented by including the forward operator in a data structure and adding additional variable, γ. The augmented wavefield is expressed in equation (16) below:

$$\text{Wavefield}_{augmented} = \sum_{w} \langle F(m)u - s, \gamma \rangle \quad (16)$$

where F is the forward operator, m is the model, u is the wavefield, s is the source, and γ is an augmentation variable. The adjoint wavefield may be augmented with the backward operator, the forward and backward sampling operators, and additional variable ζ. The augmented wavefield can be represented in equation (17) below:

$$\text{Adjoint Wavefield}_{augmented} = \sum_{w} \langle \frac{\partial J}{\partial u} + F^{*}\lambda, \zeta \rangle \quad (17)$$

where ω is the frequency, $$\frac{\partial J}{\partial u}$$

is the first order derivative of the cost function with respect to the wavefield, F* is the backward operator, λ is the adjoint, and ζ is an augmentation variable. All these elements are injected into a single data structure. Equations 3-5 are assembled in step 460 to yield the Sifrian function which is expressed in equation (11) above.

Newton directional step 570 can represent the use of the augmentation variables (γ, ζ, n) to leverage a description of the Hessian without executing the computation necessary for a full Hessian. At step 575, image generation module 210 may update the initial model, $m_0$, or any iteration of the initial model, with the results of the Sifrian inversion. Image generation module 210 may continue to update the model via an iterative process derived from the equilibrium condition of the Sifrian (i.e., its null values and derivatives). Once image generation module 210 determines that the model converges (e.g., satisfies a desired level of accuracy), the final updated model, m*, may be used to generate an image of the surveyed medium.

Figure 6:
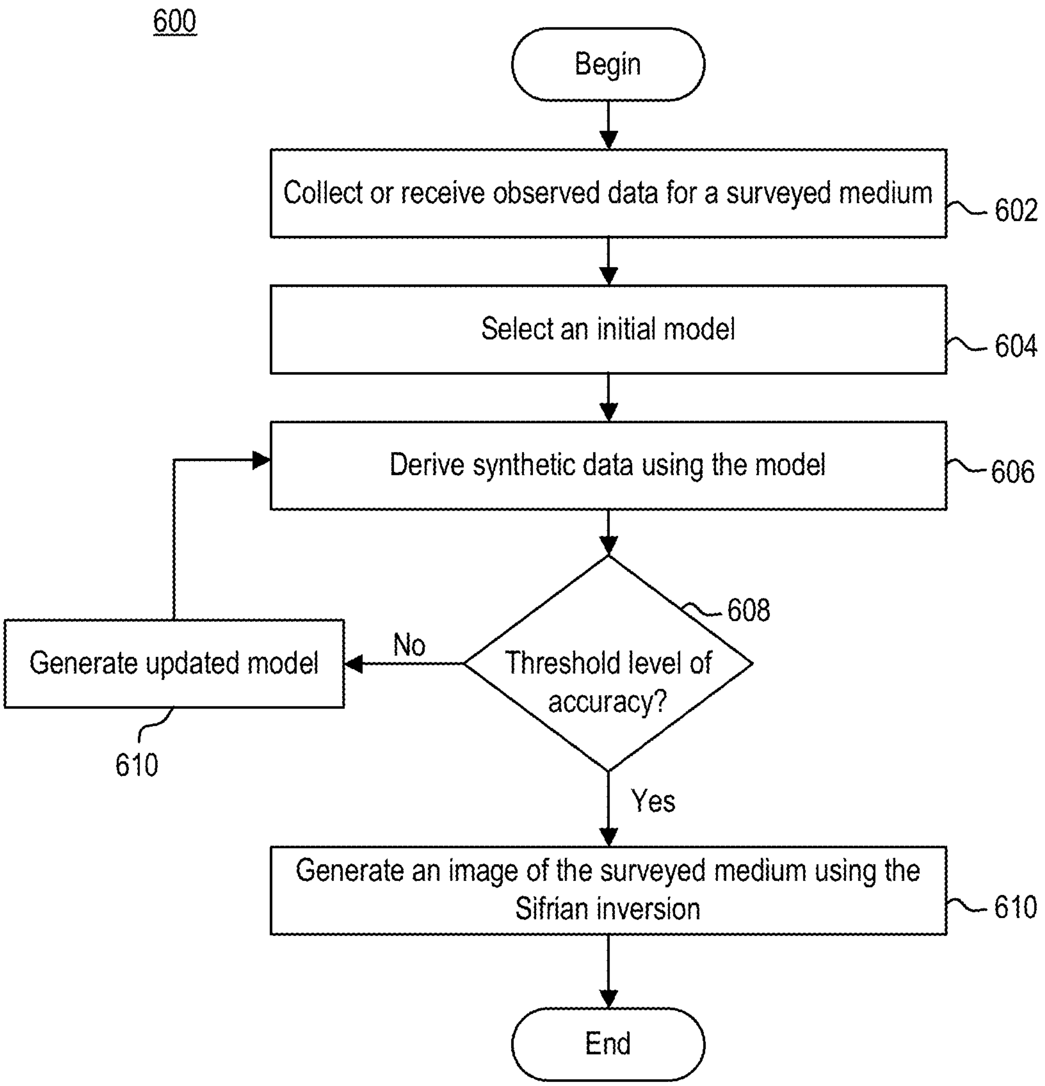
FIG. 6 is a flow diagram illustrating a method of generating an image of a surveyed medium, according to example embodiments.

FIG. 6 is a flow diagram illustrating a method 600 of generating an image of a surveyed medium, according to example embodiments. Method 600 may begin at step 602.

At step 602, computing system 202 may collect or receive observed data for a surveyed medium. In some embodiments, computing system 202 may collect or receive observed data from receiver network 100. In some embodiments, the observed data can be derived from a plurality of sensors that detect signals originating from a source.

At step 604, computing system 202 may select an initial mode. In some embodiments, the initial model may be based on an initial guess of the properties of the surveyed medium. In some embodiments, the initial model may be made available through tomography, prior inversion work, and/or expert information on materials. If no information is available, image generation module 210 may test a plurality of initial models. In some embodiments, the initial model can be expressed in terms of spatial coordinates (e.g., either 2D or 3D). The data of the initial model can be represented as a time series as a scalar or multi-component (i.e., vectors), and may be organized with reference to the wavefield source and wavefield sensors' locations, or the receiver geometry At step 606, computing system 202 may derive synthetic data from the model. For example, image generation module 210 may generate the synthetic data using the observed data and the initial model.

At step 608, computing system 202 may determine whether the model has achieved a threshold level of accuracy. If, at step 608, computing system 202 determines that the model has achieved a threshold level of accuracy, then method 600 may proceed to step 612 (discussed below). If, however, computing system 202 determines that the model has not achieved a threshold level of accuracy, then method 600 may proceed to step 610.

At step 610, computing system 202 may update the model. For example, computing system 202 may update the model with the intent of generating a model that is able to generate synthetic data that better matches the observed data to update the model, computing system 202 may utilize a Sifrian function, such as that described above in conjunction with equation 11. The Sifrian function may augment the wavefield equation, the adjoint wavefield, and the gradient definition by adding respective first, second, and third augmentation variables to each of the wavefield equation, adjoint wavefield, and gradient definition. The cost function, which quantifies mismatches between the synthetic data and the observed data, is omitted.

Such updating process may continue, iteratively, until computing system 202 generates a model that is able to generate synthetic data that matches the observed data within a predefined mismatch threshold.

At step 612, once a model is generated that able to match the observed data within a predefined mismatch threshold, computing system 202 may generate an image of the surveyed medium. The image of the surveyed medium may be used to locate an object suitable for further exploration.

It should be understood that the steps shown in FIG. 6 are merely illustrative and that additional steps may be added, that the order of the steps may be rearranged, and that some steps may be simplified or omitted.

Figure 7:
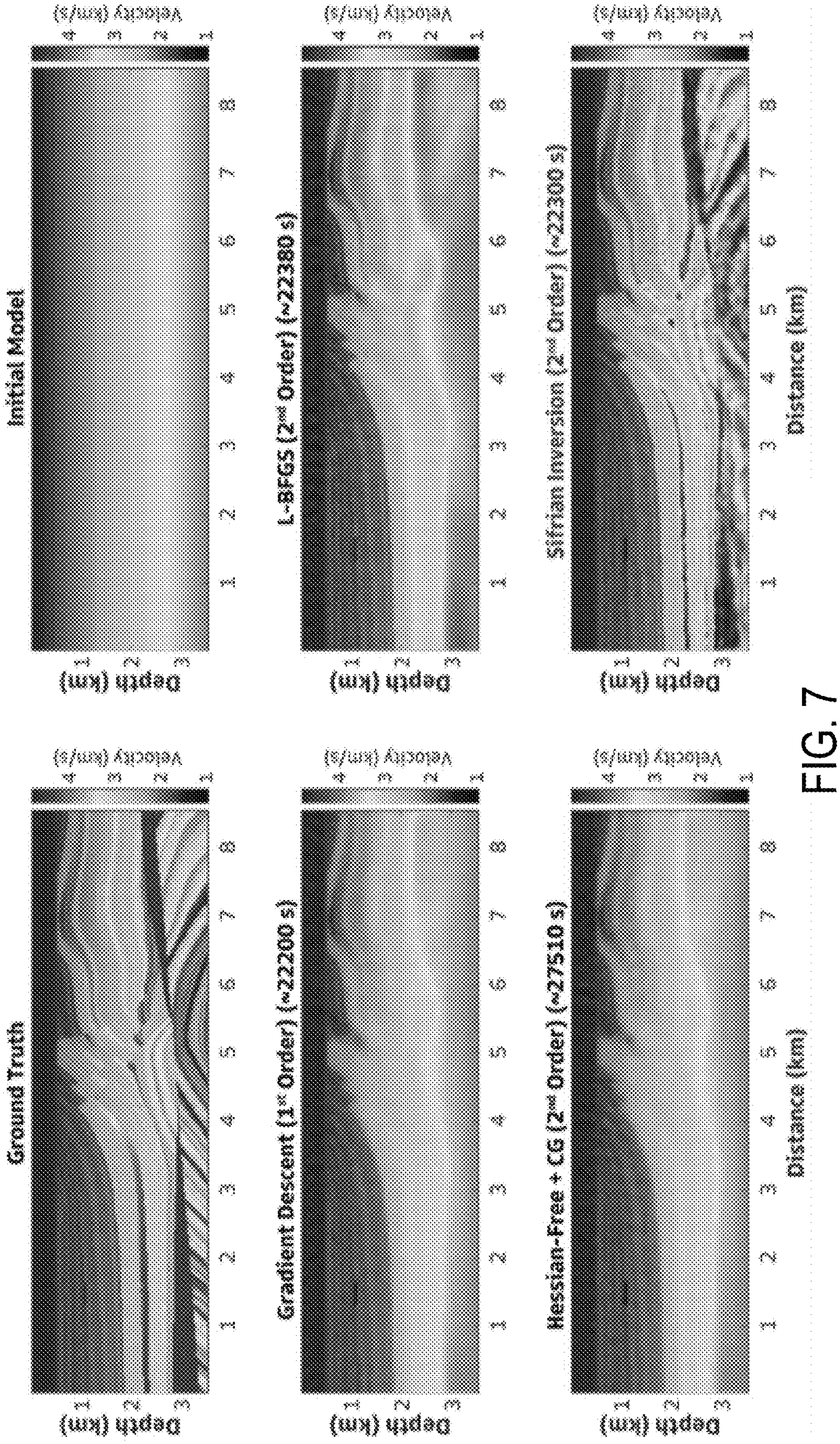
FIGS. 7-9 shows illustrative results comparing an image generated using the Sifrian inversion against images generated using conventional techniques, according to example embodiments.
Figure 8:
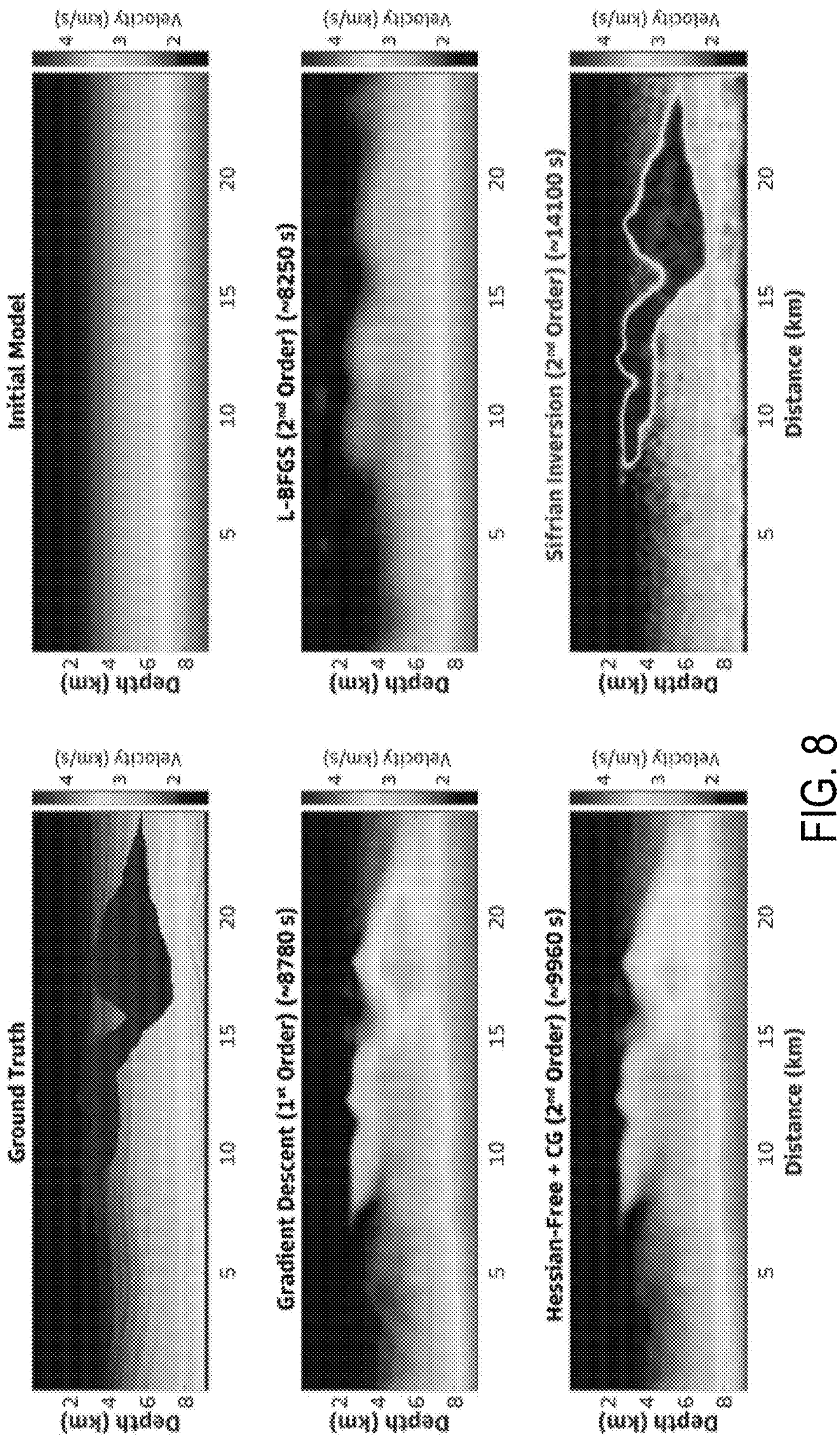
Figure 9:
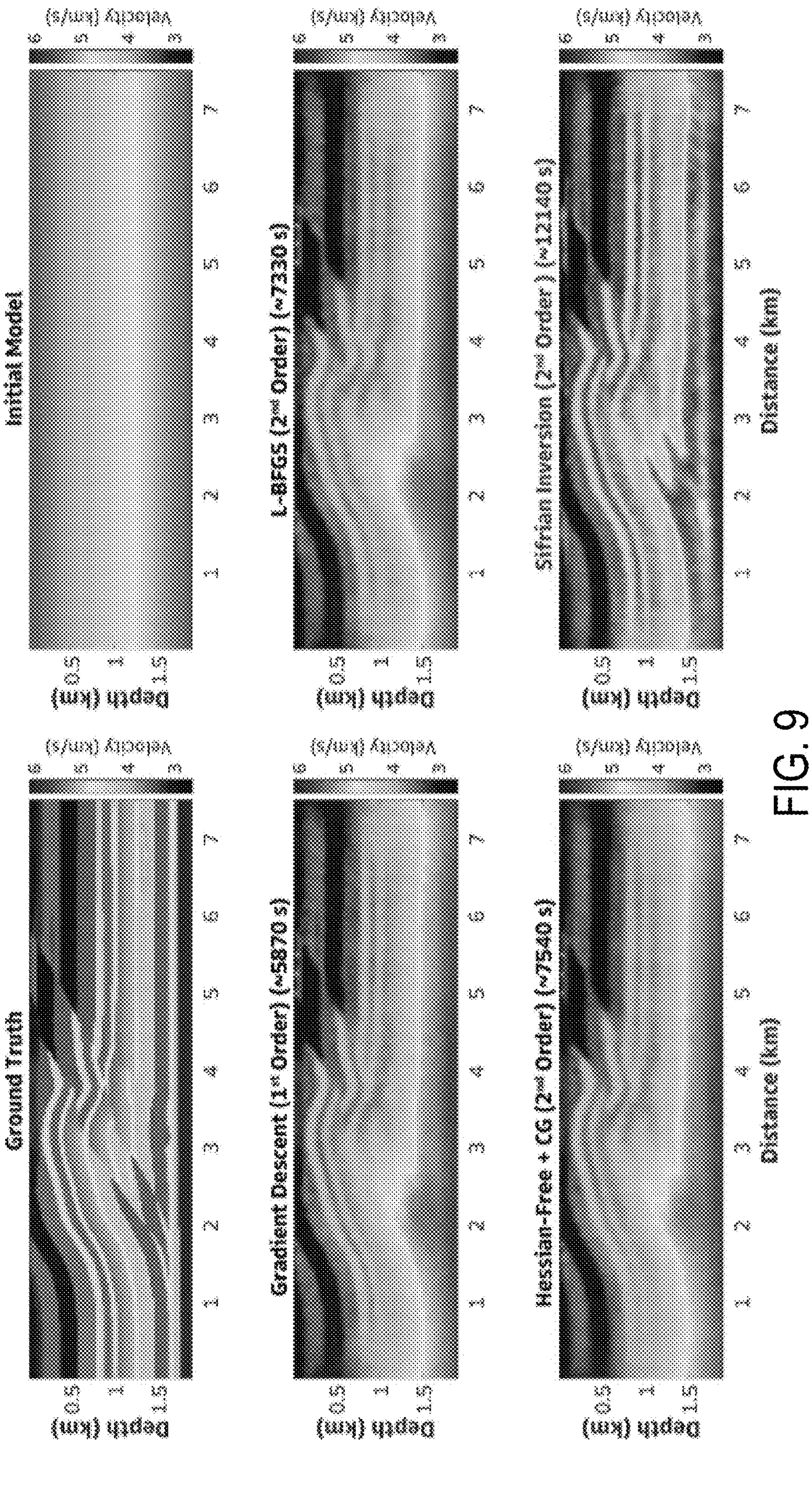

FIGS. 7-9 show synthetic examples demonstrating the superior image generation for acoustic waveforms derived from the Sifrian Inversion compared to the conventional methods for image generation. The conventional methods include the Gradient descent ($1^{st}$ order), BFGS ($2^{nd}$ order), and the Hessian Free+Conjugate gradient ($2^{nd}$ order). The Sifrian Inversion is tested for acoustic frequency-domain FWI. Three well-known geophysical benchmark models (e.g., Marmousi, Sigsbee, and Overthrust models) are used to compare the Sifrian inversion results with three conventional methods. The Gradient Descent is a fundamental and relatively old inversion method, and simply updates the velocity model with the gradient of the objective function. The limited memory, L-BFGS, is another well-known and efficient second-order inversion method, which includes the curvature information iteratively through several rank one updates (two at each iteration). This method is well established with several theoretical proofs. The Hessian Free (+Conjugate gradient): this method leverages matrix-vector product algorithms to compute the product of the curvature with a preselected update; the preselected update is changed through a Conjugate Gradient (CG). All methods are implemented with the same frequency band, starting from low to high. The same step-length selection method is applied equally. No further fine tuning has been applied. Each of FIGS. 7-9 shows a ground truth image, an initial model image, and images created by a Gradient Descent model, an L-BFGS model, a Hessian-Free+CG model, and the Sifrian Inversion model. The initial models are the same for all four inversions.

FIG. 7 shows the Marmousi model, a well-known geophysical seismic-velocity model used extensively to test new inversion methods. Substantial lateral variations on a small scale make the synthetic model challenging to invert. Inverted frequencies are between 4 and 32 Hz with a maximum of 30 iterations per frequency. The image resolution is clearer for Sifrian inversion than the other three models.

FIG. 8 shows the Sigsbee model, a large 2D model with extensive salt body (shown by the dark spot). Salt is highly reflective of seismic waves and is challenging to delineate. Inverted frequencies are between 2 and 32 Hz with 30 iterations per frequency. Note how the salt body is substantially better recovered for the Sifrian inversion compared to the other three models.

FIG. 9 shows the Overthrust model, corresponding to a frequently encountered structure in geological formations. The recovery of the low-velocity layer (at around 1.7 km depth) is a challenging task. Inverted frequencies are between 4 and 62 Hz with 30 iterations per frequency. Note that only the Sifrian Inversion is able to recover the deep low-velocity layer.

Figure 10:
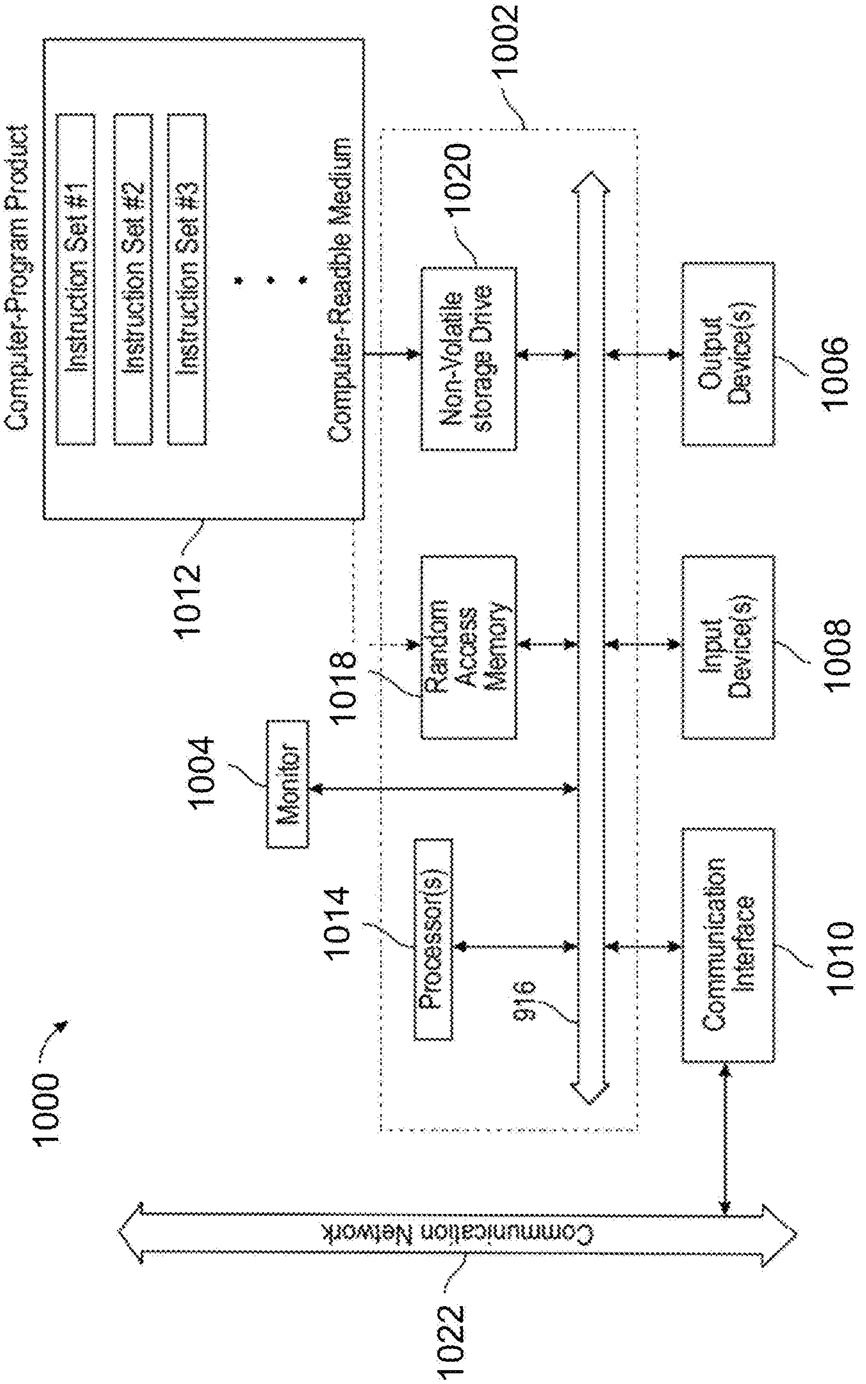
FIG. 10 is a block diagram of a special-purpose computer system, according to example embodiments.

FIG. 10 is a block diagram of a special-purpose computer system 1000 according to an embodiment. The methods and processes described herein may similarly be implemented by tangible, non-transitory computer readable storage mediums and/or computer-program products that direct a computer system to perform the actions of the methods and processes described herein. Each such computer-program product may comprise sets of instructions (e.g., codes) embodied on a computer-readable medium that directs the processor of a computer system to perform corresponding operations. The instructions may be configured to run in sequential order, or in parallel (such as under different processing threads) or in combination.

Special-purpose computer system 1000 comprises a computer 1002, a monitor 1004 coupled to computer 1002, one or more additional user output devices 1006 (optional) coupled to computer 1002, one or more user input devices 1008 (e.g., keyboard, mouse, trackball, touch screen) coupled to computer 1002, an optional communications interface 1010 coupled to computer 1002, and a computer-program product including a tangible computer-readable storage medium 1012 in or accessible to computer 1002. Instructions stored on computer-readable storage medium 1012 may direct system 1000 to perform the methods and processes described herein. Computer 1002 may include one or more processors 1014 that communicate with a number of peripheral devices via a bus subsystem 1016. These peripheral devices may include user output device(s) 1006, user input device(s) 1008, communications interface 1010, and a storage subsystem, such as random-access memory (RAM) 1018 and non-volatile storage drive 1020 (e.g., disk drive, optical drive, solid state drive), which are forms of tangible computer-readable memory.

Computer-readable medium 1012 may be loaded into random access memory 1018, stored in non-volatile storage drive 1020, or otherwise accessible to one or more components of computer 1002. Each processor 1014 may comprise a microprocessor, such as a microprocessor from Intel® or Advanced Micro Devices, Inc.®, or the like. To support computer-readable medium 1012, the computer 1002 runs an operating system that handles the communications between computer-readable medium 1012 and the above-noted components and the communications between the above-noted components in support of the computer-readable medium 1012. Exemplary operating systems include Windows® or the like from Microsoft Corporation, Solaris® from Sun Microsystems, LINUX, UNIX, and the like. In many embodiments and as described herein, the computer-program product may be an apparatus (e.g., a hard drive including case, read/write head, etc., a computer disc including case, a memory card including connector, case, etc.) that includes a computer-readable medium (e.g., a disk, a memory chip, etc.). In other embodiments, a computer-program product may comprise the instruction sets or code modules themselves and be embodied on a computer-readable medium.

User input devices 1008 include all possible types of devices and mechanisms to input information to computer system 1002. These may include a keyboard, a keypad, a mouse, a scanner, a digital drawing pad, a touch screen incorporated into the display, audio input devices such as voice recognition systems, microphones, and other types of input devices. In various embodiments, user input devices 1008 are typically embodied as a computer mouse, a trackball, a trackpad, a joystick, a wireless remote, a drawing tablet, and a voice command system. User input devices 1008 typically allow users to select objects, icons, text and the like that appear on the monitor 1004 via a command such as a click of a button or the like. User output devices 1006 include all possible types of devices and mechanisms to output information from computer 1002. These may include a display (e.g., monitor 1004), printers, non-visual displays such as audio output devices, etc.

Communications interface 1010 provides an interface to other communication networks and devices and may serve as an interface to receive data from and transmit data to other systems, WANs and/or the Internet, via a wired or wireless communication network 1022. Embodiments of communications interface 1010 typically include an Ethernet card, a modem (telephone, satellite, cable, ISDN), an (asynchronous) digital subscriber line (DSL) unit, a FireWire® interface, a USB® interface, a wireless network adapter, and the like. For example, communications interface 1010 may be coupled to a computer network, to a FireWire® bus, or the like. In other embodiments, communications interface 1010 may be physically integrated on the motherboard of computer 1002, and/or may be a software program, or the like.

RAM 1018 and non-volatile storage drive 1020 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, and semiconductor memories such as flash memories, read-only-memories (ROMs), battery-backed volatile memories, networked storage devices, and the like. RAM 1018 and non-volatile storage drive 1020 may be configured to store the basic programming and data constructs that provide the functionality of various embodiments of the present invention, as described above.

Software instruction sets that provide the functionality of the embodiments discussed herein may be stored in computer-readable medium 1012, RAM 1018, and/or non-volatile storage drive 1020. These instruction sets or code may be executed by the processor(s) 1014. Computer-readable medium 1012, RAM 1018, and/or non-volatile storage drive 1020 may also provide a repository to store data and data structures used in accordance with the embodiments discussed herein. RAM 1018 and non-volatile storage drive 1020 may include a number of memories including a main random-access memory (RAM) to store instructions and data during program execution and a read-only memory (ROM) in which fixed instructions are stored. RAM 1018 and non-volatile storage drive 1020 may include a file storage subsystem providing persistent (non-volatile) storage of program and/or data files. RAM 1018 and non-volatile storage drive 1020 may also include removable storage systems, such as removable flash memory.

Bus subsystem 1016 provides a mechanism to allow the various components and subsystems of computer 1002 to communicate with each other as intended. Although bus subsystem 1016 is shown schematically as a single bus, alternative embodiments of the bus subsystem may utilize multiple busses or communication paths within the computer 1002.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. The memory may be implemented within the processor or external to the processor. As used herein the term "memory" refers to any type of long term, short term, volatile, non-volatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes but is not limited to portable or fixed storage devices, optical storage devices, wireless channels, and/or various other storage mediums capable of storing that contain or carry instruction(s) and/or data.

Whereas many alterations and modifications of the present invention will no doubt become apparent to a person of ordinary skill in the art after having read the preceding description, it is to be understood that the particular embodiments shown and described by way of illustration are in no way intended to be considered limiting.

Moreover, the processes described with respect to one or more of FIGS. 1-10, as well as any other aspects of the disclosure, may each be implemented by software, but may also be implemented in hardware, firmware, or any combination of software, hardware, and firmware. Instructions for performing these processes may also be embodied as a machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and optical data storage devices. In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communication protocol. Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module of any one or more of any system, device, or server may be provided as a software construct, firmware construct, one or more hardware components, or a combination thereof, and may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of any one or more of any system devices, or server are merely illustrative, and that the number, configuration, functionality, and interconnection of existing modules may be modified or omitted, additional modules may be added, and the interconnection of specific modules may be altered.

While there have been described systems, methods, and computer-readable media for enabling efficient control of a media application at an electronic media device by an electronic user device, it is to be understood that many changes may be made therein without departing from the spirit and scope of the disclosure. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method for waveform imaging comprising:

receiving, by a computing system, observed data from a surveyed medium via a plurality of sensors;

obtaining, by the computing system, an available model of the surveyed medium;

generating, by the computing system, synthetic data using the available model;

comparing, by the computing system, the synthetic data to the observed data;

iteratively updating the available model, using a Sifrian inversion, based on the comparing of the synthetic data to the observed data; and generating, by the computing system, a final model or a final image of the surveyed medium using the updated available model.

2. The method of claim 1, wherein iteratively updating the available model, using the Sifrian inversion, based on the comparing of the synthetic data to the observed data comprises:

iteratively updating the available model until the synthetic data matches the observed data within a matching threshold; and generating a Sifrian functional based on one or more of a wavefield equation, an adjoint wavefield, and a gradient definition of the available model.

3. The method of claim 2, wherein generating the Sifrian functional based on the one or more of the wavefield equation, the adjoint wavefield, and the gradient definition of the available model comprises:

augmenting the wavefield equation by adding a plurality of augmentation variables to the wavefield equation; and generating the Sifrian functional based on the augmented wavefield equation.

4. The method of claim 2, wherein generating the Sifrian functional based on the one or more of the wavefield equation, the adjoint wavefield, and the gradient definition of the available model comprises:

augmenting the adjoint wavefield by adding a plurality of augmentation variables to the adjoint wavefield; and generating the Sifrian functional based on the adjoint wavefield.

5. The method of claim 2, wherein generating the Sifrian functional based on the one or more of the wavefield equation, the adjoint wavefield, and the gradient definition of the available model comprises:

augmenting the gradient definition by adding a plurality of augmentation variables to the gradient definition; and generating the Sifrian functional based on the gradient definition.

6. The method of claim 2, wherein a cost function that quantifies mismatches between the synthetic data and the observed data is omitted from the Sifrian functional.

7. The method of claim 2, wherein the Sifrian functional is null when in equilibrium.

8. A system for waveform imaging and model building comprising:

a processor; and a memory having programming instruction stored thereon, which, when executed by the processor, causes the system to perform operations comprising:

receiving observed data from a surveyed medium via a plurality of sensors;

obtaining an available model of the surveyed medium;

generating synthetic data using the available model;

comparing the synthetic data to the observed data;

iteratively updating the available model, using a Sifrian inversion, based on the comparing of the synthetic data to the observed data; and generating a final model or a final image of the surveyed medium using the updated available model.

9. The system of claim 8, wherein iteratively updating the available model, using the Sifrian inversion, based on the comparing of the synthetic data to the observed data comprises:

iteratively updating the available model until the synthetic data matches the observed data within a matching threshold; and generating a Sifrian functional based on one or more of a wavefield equation, an adjoint wavefield, and a gradient definition of the available model.

10. The system of claim 9, wherein generating the Sifrian functional based on the one or more of the wavefield equation, the adjoint wavefield, and the gradient definition of the available model comprises:

augmenting the wavefield equation by adding a plurality of augmentation variables to the wavefield equation; and generating the Sifrian functional based on the augmented wavefield equation.

11. The system of claim 9, wherein generating the Sifrian functional based on the one or more of the wavefield equation, the adjoint wavefield, and the gradient definition of the available model comprises:

augmenting the adjoint wavefield by adding a plurality of augmentation variables to the adjoint wavefield; and generating the Sifrian functional based on the adjoint wavefield.

12. The system of claim 9, wherein generating the Sifrian functional based on the one or more of the wavefield equation, the adjoint wavefield, and the gradient definition of the available model comprises:

augmenting the gradient definition by adding a plurality of augmentation variables to the gradient definition; and generating the Sifrian functional based on the gradient definition.

13. The system of claim 9, wherein a cost function that quantifies mismatches between the synthetic data and the observed data is omitted from the Sifrian functional.

14. The system of claim 9, wherein the Sifrian functional is null when in equilibrium.

15. A non-transitory computer readable medium comprising one or more sequences of instructions, which, when executed by one or more processors, causes a computing system to perform operations comprising:

receiving, by the computing system, observed data from a surveyed medium via a plurality of sensors;

obtaining, by the computing system, an available model of the surveyed medium;

generating, by the computing system, synthetic data using the available model;

comparing, by the computing system, the synthetic data to the observed data;

iterative updating the available model, using a Sifrian inversion, based on the comparing of the synthetic data to the observed data; and generating, by the computing system, a final model or a final image of the surveyed medium using the updated available model.

16. The non-transitory computer readable medium of claim 15, wherein iteratively updating the available model, using the Sifrian inversion, based on the comparing of the synthetic data to the observed data comprises:

iteratively updating the available model until the synthetic data matches the observed data within a matching threshold; and generating a Sifrian functional based on one or more of a wavefield equation, an adjoint wavefield, and a gradient definition of the available model.

17. The non-transitory computer readable medium of claim 16, wherein generating the Sifrian functional based on the one or more of the wavefield equation, the adjoint wavefield, and the gradient definition of the available model comprises:

augmenting the wavefield equation by adding a plurality of augmentation variables to the wavefield equation; and generating the Sifrian functional based on the augmented wavefield equation.

18. The non-transitory computer readable medium of claim 16, wherein generating the Sifrian functional based on the one or more of the wavefield equation, the adjoint wavefield, and the gradient definition of the available model comprises:

augmenting the adjoint wavefield by adding a plurality of augmentation variables to the adjoint wavefield; and generating the Sifrian functional based on the adjoint wavefield.

19. The non-transitory computer readable medium of claim 16, wherein generating the Sifrian functional based on the one or more of the wavefield equation, the adjoint wavefield, and the gradient definition of the available model comprises:

augmenting the gradient definition by adding a plurality of augmentation variables to the gradient definition; and generating the Sifrian functional based on the gradient definition.

20. The non-transitory computer readable medium of claim 16, wherein a cost function that quantifies mismatches between the synthetic data and the observed data is omitted from the Sifrian functional.

* * * * *